United States Patent
Nouhaud

(10) Patent No.: US 10,137,997 B2
(45) Date of Patent: Nov. 27, 2018

(54) ELECTRONIC THROTTLE SYSTEM FOR AN AIRCRAFT

(71) Applicant: Bombardier Inc., Dorval (CA)

(72) Inventor: Christophe Nouhaud, Montreal (CA)

(73) Assignee: BOMBARDIER INC., Dorval (CA)

(*) Notice: Subject to any disclaimer, the term of this patent is extended or adjusted under 35 U.S.C. 154(b) by 190 days.

(21) Appl. No.: 14/914,134

(22) PCT Filed: Aug. 28, 2014

(86) PCT No.: PCT/IB2014/064120
§ 371 (c)(1),
(2) Date: Feb. 24, 2016

(87) PCT Pub. No.: WO2015/028963
PCT Pub. Date: Mar. 5, 2015

(65) Prior Publication Data
US 2016/0214730 A1 Jul. 28, 2016

Related U.S. Application Data

(60) Provisional application No. 61/871,670, filed on Aug. 29, 2013.

(51) Int. Cl.
*G01C 21/00* (2006.01)
*B64D 31/04* (2006.01)

(52) U.S. Cl.
CPC .................................. *B64D 31/04* (2013.01)

(58) Field of Classification Search
CPC ........................................................ B64D 31/04
See application file for complete search history.

(56) References Cited

U.S. PATENT DOCUMENTS 4,651,954 A 3/1987 Miller
9,481,471 B2* 11/2016 Newman .................. F02K 3/00
(Continued)

FOREIGN PATENT DOCUMENTS

CN 102574585 A 7/2012
EP 2442195 A2 4/2012
(Continued)

OTHER PUBLICATIONS

The State Intellectual Property Office of the People's Republic of China; Notification of Second Office Action dated Jun. 2, 2017 re: Application No. 201480047879.3.
(Continued)

*Primary Examiner* — Ian Jen
(74) *Attorney, Agent, or Firm* — Norton Rose Fulbright Canada LLP

(57) ABSTRACT

A throttle system for providing throttle control for an engine on an aircraft includes a throttle quadrant assembly (TQA) module (92, 94) in electrical communication with a throttle lever (86) for receiving a position signal (88, 90) indicative of a magnitude for a throttle of the engine, the TQA module (92, 94) being operative to convert the position signal (88, 90) into a throttle signal, an engine electronic control (EEC) module (100, 102) connected to the TQA module (92, 94) to translate the throttle signal (88, 90) into a throttle control signal for the engine, and at least one signal/power line connecting the TQA module (92, 94) to the EEC module (100, 102). The signal/power line at least carries the throttle signal from the TQA module to the EEC module.

17 Claims, 5 Drawing Sheets

(56) References Cited

U.S. PATENT DOCUMENTS

| | | | |
|---|---|---|---|
| 2008/0195259 A1* | 8/2008 | Davis | H04B 3/548 701/1 |
| 2010/0042267 A1 | 2/2010 | Goodman et al. | |
| 2010/0241332 A1 | 9/2010 | Andrieu | |
| 2011/0134976 A1* | 6/2011 | Fossion | H04B 3/548 375/222 |
| 2012/0095662 A1 | 4/2012 | Roy et al. | |
| 2012/0099627 A1* | 4/2012 | Mitchell | H04B 3/546 375/222 |
| 2013/0003756 A1* | 1/2013 | Mitchell | H04B 3/542 370/464 |
| 2014/0314160 A1* | 10/2014 | Lee | H04B 3/544 375/257 |
| 2015/0051788 A1* | 2/2015 | Lee | G06F 11/30 701/31.5 |
| 2015/0215899 A1* | 7/2015 | Kumar | H04W 72/02 455/59 |

FOREIGN PATENT DOCUMENTS

| | | |
|---|---|---|
| WO | 2010147867 A1 | 12/2010 |
| WO | 2013000035 A1 | 1/2013 |

OTHER PUBLICATIONS

The State Intellectual Property Office of the People's Republic of China; Notification of First Office Action dated Sep. 5, 2016 re: Application No. 201480047879.3.
English translation of Chinese patent document No. CN 102574585 dated Jul. 11, 2012; www.google.ca/patents . . . .
PCT international Search Report and Written Opinion dated Jan. 5, 2015 re: International Application No. PCT/IB2014/064120.
The State Intellectual Property Office of the People's Republic of China; Notification of Third Office Action dated Dec. 4, 2017 re: Application No. 201480047879.3.
European Patent Office, Communication pursuant to Article 94(3) EPC dated May 11, 2018 re: application No. 14 766 542.6.

\* cited by examiner

ELECTRONIC THROTTLE SYSTEM FOR AN AIRCRAFT

CROSS-REFERENCE TO RELATED APPLICATION(S)

This application is a national phase application under 35 U.S.C. 371 of International Patent Application No. PCT/IB2014/064120 filed on Aug. 28, 2014, which claims priority from U.S. Provisional Patent Application Ser. No. 61/871,670 filed on Aug. 29, 2013, the entire content of which is incorporated herein by reference.

FIELD OF THE INVENTION

The present invention concerns a construction for an electronic throttle system for an aircraft. More specifically, the present invention concerns an electronic throttle system that uses a common signal/power line to transmit throttle signals to an engine electronic control unit.

DESCRIPTION OF THE RELATED ART

Conventionally, electronic throttle systems incorporate a significant length of wires to connect the engines in the aircraft with the control systems that are manipulated by members of the flight crew. Specifically, due to particular regulatory requirements and safety considerations, such systems incorporate several redundant wires and cables.

As should be apparent to those skilled in the art, multiple, redundant wires and cables add weight to the aircraft.

In addition, multiple, redundant wires and cables increase the complexity associated with the manufacture and maintenance of the aircraft.

At least in view of one or more issues associated with reliance on multiple, redundant wires and cables, a desire has arisen to consider ways in which components in an aircraft may be reconfigured to reduce the complexity of the associated systems and also to reduce the weight of those systems.

As should be apparent to those skilled in the art, systems that are less complex may be assembled more easily and at a lower cost.

In addition, systems that require less materials weigh less. Aircraft that weigh less may be operated with increased efficiency, as a general rule.

It is in the context of this confluence of factors that the present invention was developed.

SUMMARY OF THE INVENTION

The present invention addresses one or more of the deficiencies noted with respect to the prior art.

In one contemplated embodiment, the present invention provides a throttle system for providing throttle control for an engine on an aircraft. The throttle system includes a throttle quadrant assembly (TQA) module in electrical communication with a throttle lever for receiving a position signal indicative of a magnitude for a throttle of the engine, the TQA module being operative to convert the position signal into a throttle signal, an engine electronic control (EEC) module connected to the TQA module to translate the throttle signal into a throttle control signal for the engine, and at least one signal/power line connecting the TQA module to the EEC module. The signal/power line at least carries the throttle signal from the TQA module to the EEC module.

In another contemplated embodiment, the signal/power line also at least carries power from the EEC module to the TQA module. In this embodiment, it is contemplated that the signal/power line carries both the throttle signal and the power by relying on power line communication (PLC).

It is also contemplated that the throttle system may include a rotary variable differential transformer (RVDT) connected to the throttle lever. The RVDT includes at least three coils adapted to detect the position of the throttle lever and generate the position signal commensurate therewith.

In one contemplated embodiment, the throttle system may include a wiring block comprising the signal/power line and a ground line extending between the TQA module to the EEC module.

The TQA module may include an RVDT demodulator connected to the RVDT that receives the position signal and generates a demodulated position signal.

The TQA module also may include a TQA controller connected to the RVDT demodulator that receives the demodulated position signal and generates a controller throttle signal.

The TQA module may include a TQA transceiver connected to the TQA controller to translate the controller throttle signal into the throttle signal before introducing the throttle signal to the signal/power line.

The EEC module may include an EEC transceiver connected to the signal/power line to receive the throttle signal and decode the throttle signal to recreate the controller throttle signal.

The EEC module also may include an EEC controller that receives the controller throttle signal from the EEC transceiver and generates a throttle control signal to be sent to the engine.

In addition, the EEC module may include a main power bus that provides power to the EEC module and the TQA module.

The main power bus may provide power to the TQA module via the signal/power line.

The present invention also provides for a throttle quadrant assembly (TQA) module that includes a demodulator in electrical communication with at least one position measurement sensor that is connected to a throttle lever. The demodulator receives from the at least one position measurement sensor a throttle lever position signal and generates from the throttle lever position signal a demodulated position signal. The TQA module also includes a TQA controller in electrical communication with the demodulator for receiving the demodulated position signal and generating a controller throttle signal and a TQA transceiver connected to the TQA controller to translate the controller throttle signal into a throttle signal before introducing the throttle signal to a signal/power line for transmission towards an engine electronic control (EEC).

Still further, the present invention provides for a method of operation for a throttle quadrant assembly (TQA) module in electrical communication with a throttle lever of an aircraft. The method includes receiving a position signal indicative of a position of the throttle lever from a position measurement sensor. The position signal is indicative of a magnitude for a throttle of the engine. The method also includes demodulating the position signal in order to generate a demodulated position signal, processing the demodulated position signal in order to generate a throttle signal suitable for transmission to an engine electronic control (EEC), and introducing the throttle signal to a signal/power line in order to transmit the throttle signal from the TQA module to the engine electronic control (EEC).

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of an electronic throttle for a jet aircraft where one or more jet engines (also referred to as turbine engines or turbofan engines) are affixed (or attached) to each wing of the aircraft. While the invention is discussed in this context, the present invention is not intended to be limited solely to the construction of aircraft with wing-born jet engines. It is contemplated that the present invention may be employed in connection with the electronic throttle assembly for other engine types such as turboprop engines and the like.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or bow end) of the aircraft. The term "rear" (or its equivalent) refers to the aft end (back end or stern) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
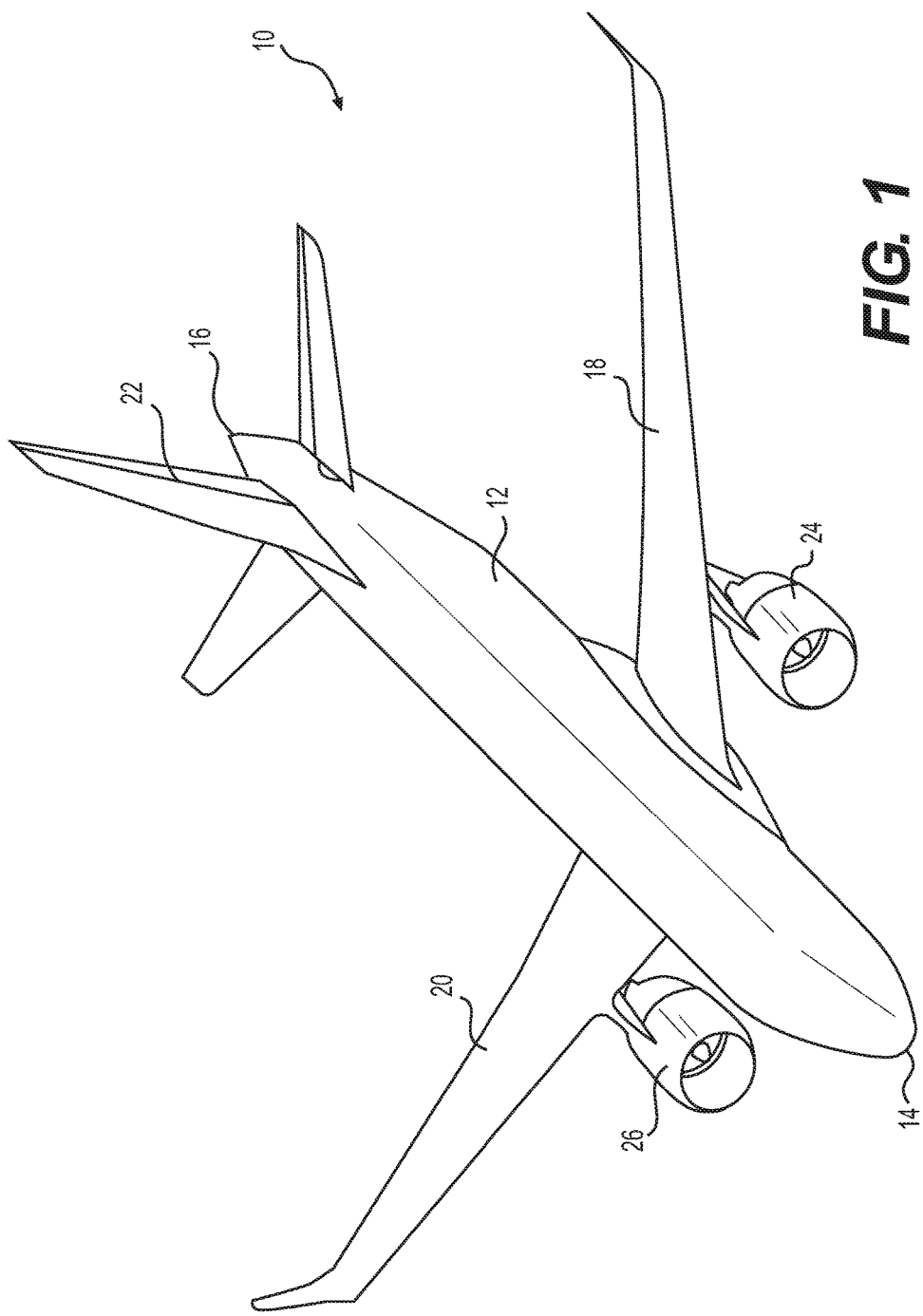
FIG. 1 is a perspective illustration of a typical aircraft on which the electronic throttle configuration of the present invention may be installed.

FIG. 1 is a perspective illustration of an aircraft 10 to which the electronic throttle layout of the present invention applies. The aircraft 10 includes a fuselage 12 longitudinally defining a forward end 14 and a rear (or aft) end 16. Two wings 18, 20 extend laterally from the fuselage 12. A tail section 22 (or empennage) is attached to the rear end 16 of the aircraft. As should be apparent to those skilled in the art, the wings 18, 20 and the tail section 22 incorporate multiple control surfaces that are responsible for the flying characteristics and operation of the aircraft 10. Two engines 24, 26 are suspended from and connect to the wings 18, 20, as illustrated.

Figure 2:
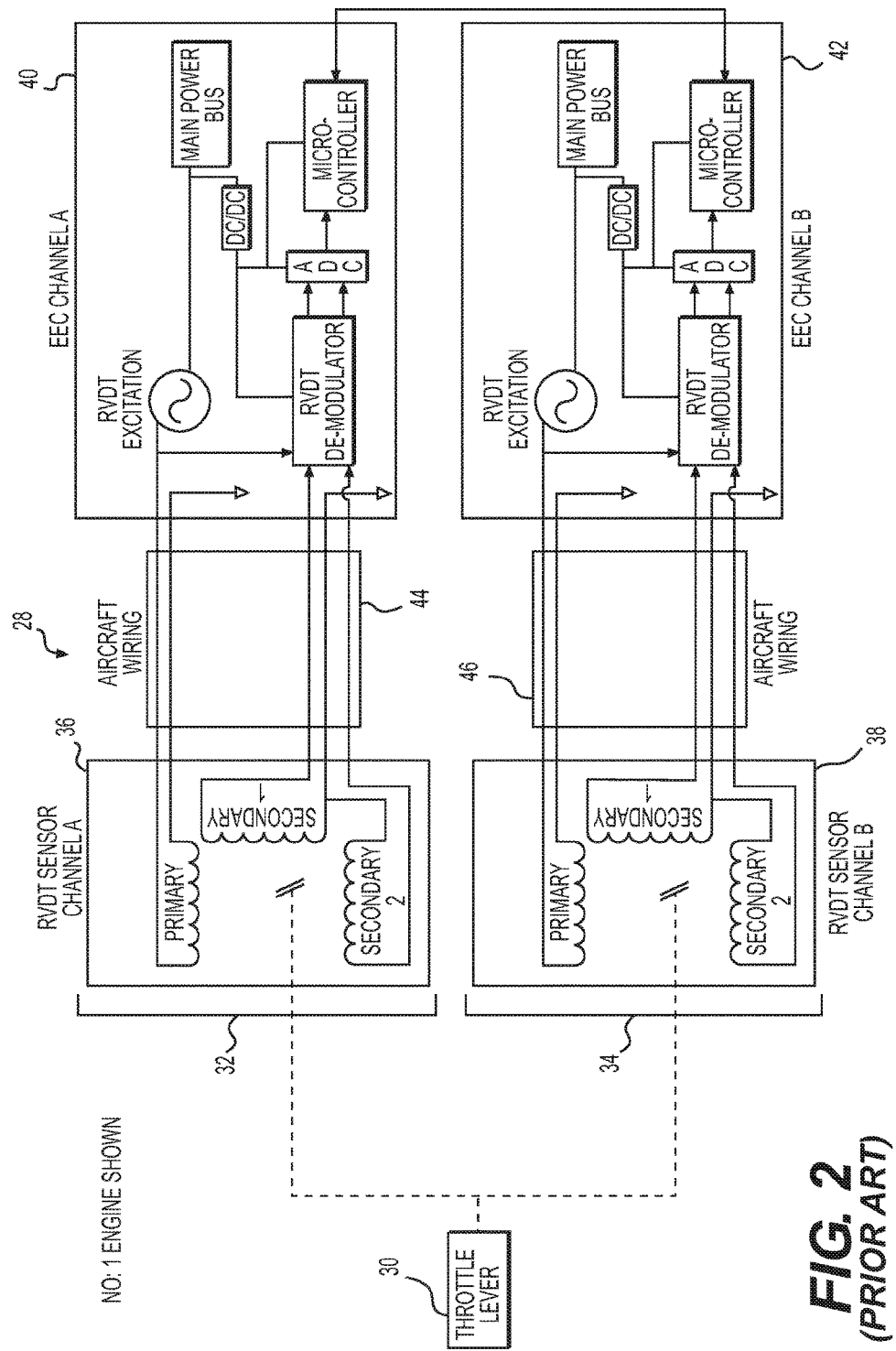
FIG. 2 is a circuit diagram illustrating one electronic throttle system that is known in the prior art.

FIG. 2 is a circuit layout for a prior art throttle system 28. The conventional electronic throttle system 28 includes a throttle lever 30 that provides throttle information to the throttle system 28 from the flight crew. The flight crew includes, but is not limited to, the pilot, co-pilot and other personnel operating the aircraft 10 from the flight deck (or cockpit).

For redundancy, which is required for any aircraft 10, the throttle 30 is connected to a first channel 32, referred to as "Channel A," and a second channel 34, referred to as "Channel B." The two channels 32, 34 operate independently from one another. As such, if one channel 32, 34 should fail, the redundant channel 32, 34 is contemplated to continue to function so that the aircraft 10 remains operational.

Being redundant, each channel 32, 34 includes the same electronic components. In particular, from a macroscopic perspective, each channel 32, 34 comprises the following three components: (1) a Rotary Variable Differential Transformer ("RVDT") 36, 38, (2) an Engine Electronic Control unit ("EEC") 40, 42, and (3) a wiring block 44, 46. As should be apparent from FIG. 2, each of the wiring blocks 44, 46 connects a respective one of the RVDTs 36, 38 to one of the EECs 40, 42.

Since each of the channels 32, 34 are redundant, they contain the same electronic components. As a result, a discussion of one of the channels 32, 34 is considered to be sufficient to describe both channels 32, 34. For this reason, reference is now made to FIG. 3, which illustrates the first channel 32 depicted in FIG. 2.

Figure 3:
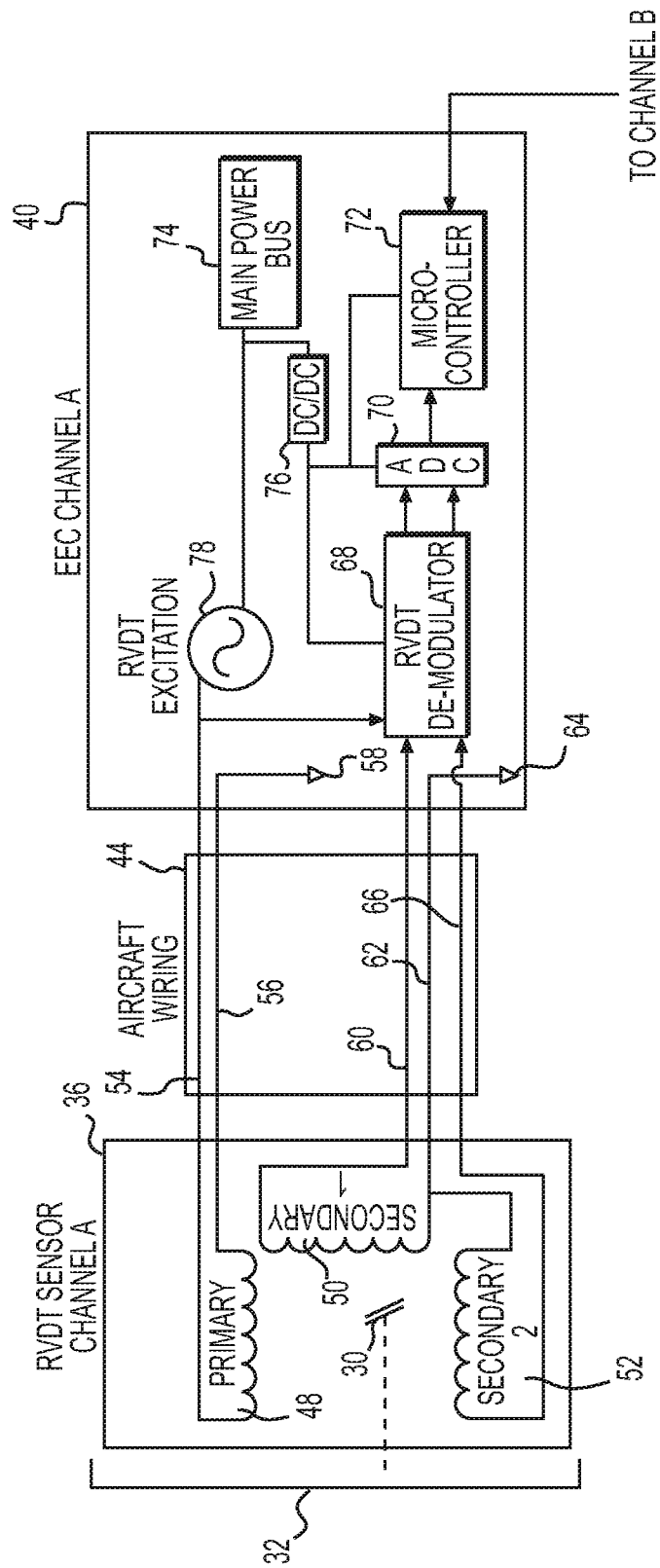
FIG. 3 is a circuit diagram of one of the two channels for the prior art electronic throttle system that is illustrated in FIG. 2.

As illustrated in FIG. 3, the first RVDT 36 for the first channel 32 (i.e., Channel A) includes three sensor coils: (1) a primary sensor coil 48, (2) a first secondary coil 50, and a second secondary coil 52. The three coils 48, 50, 52 collectively provide the requisite position signals from the throttle 30. In one contemplated mode of operation, the primary sensor coil 48 is excited by the EEC 40, which allows the primary sensor coil 48 to generate signals back to the secondary coils 50, 52, as should be apparent to those skilled in the art. The secondary coils 50, 52 determine the angle of the sensor axis, as also should be apparent to those skilled in the art.

The primary coil 48 is connected to a signal wire 54 and a ground wire 56. The signal wire 54 conveys the signal generated by the EEC 40 to the primary coil 48 via the wiring block 44. The ground wire 56 leads to a ground 58.

The first secondary coil 50 also connects to a signal wire 60 and a ground wire 62. The signal wire 60 carries the signal generated by the first secondary coil 50 to the EEC 40. The ground wire 62 connects to a ground 64.

As illustrated in FIG. 3, the second secondary coil 52 connects to a signal wire 66 and the ground wire 62. As is apparent from FIG. 3, the first secondary coil 50 and the second secondary coil 52 share the same ground wire 62 and the same ground 64.

The signal wires 54, 60, 66 provide throttle signals from the throttle lever 30 to the RVDT demodulator 68, which may be implemented as hardware, software, or a combination of hardware and software. Signals processed by the RVDT demodulator 68 are sent, via an AC/DC converter 70, to the micro-controller 72 (also referred more broadly to herein as a controller 72). The micro-controller 72 processes the throttle signals to provide control from the throttle to the engine 24, 26.

Also illustrated in FIG. 3 is a main power bus 74 that provides power to the RVDT demodulator 68, the AC/DC converter 70 and the micro-controller 72 via a DC to DC convertor 76, which is provided to convert the voltage of the power from the voltage of the main power bus 74 to a voltage suitable for the electronic components attached thereto. The EEC 40 also includes a RVDT exciter 78 connected between the main power bus 74 and the signal wire 54 from the primary coil 48. Power is provided from the main power bus 74 to the coils 48, 50, 52 via the RVDT exciter 78.

As is apparent from FIG. 3, the aircraft wiring block 44 contains five separate wires 54, 56, 60, 62, 66. These wires 54, 56, 60, 62, 66 extend from the flight deck to the EEC 40, which is positioned proximate to the engines 24, 26. As a result, the wires 54, 56, 60, 62, 66 which have to travel a considerable distance collectively add considerable weight to the aircraft 10. In addition, considerable time is expended positioning the wires 54, 56, 60, 62, 64 in the aircraft 10 and in maintaining the operability of the wires 54, 56, 60, 62, 66 during the operational lifetime of the aircraft 10.

As should be apparent to those skilled in the art, since there are two channels 32, 34, and two engines 24, 26, there are a total of twenty wires associated with the wiring blocks 44, 46 for each aircraft 10. If the aircraft 10 were to include additional engines 24, 26, additional wires would be necessary, adding more weight and complexity to the aircraft 10.

As noted above, when the aircraft 10 is operating, the coils 48, 50, 52 together generate throttle signals for processing by the micro-controller 72.

As noted above, it is one aspect of the present invention to provide an electronic throttle system 80 for the aircraft 10 that reduces the total number of wires extending from the flight deck to the micro-controller(s) 72 responsible for controlling the throttle inputs to the engines 24, 26.

Figure 4:
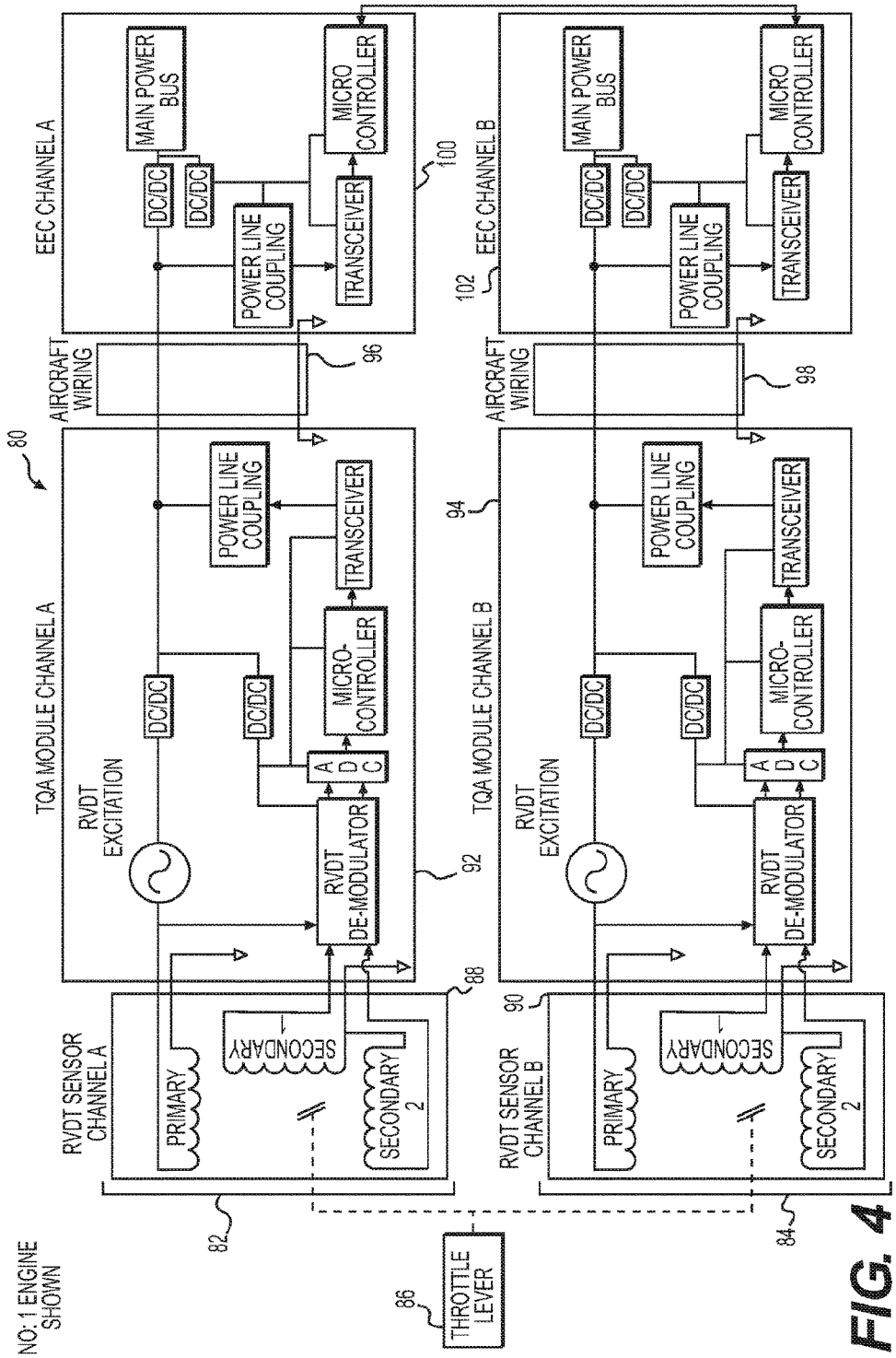
FIG. 4 is a circuit diagram of an electronic throttle system according to the present invention.

In keeping with at least this aspect, and as illustrated in FIG. 4, the present invention provides an electronic throttle system 80 that incorporates a first channel 82 and a second channel 84 for redundancy. As with the prior art throttle system 28, the two channels 82, 84 operate independently of one another and are each capable of providing control over the throttle signals provided to the engines 24, 26 of the aircraft 10.

The electronic throttle system 80 includes, therefore, a throttle 86 that is connected to two RVDT sensor modules 88, 90, one for each channel 82, 84. Although RVDT sensor modules 88, 90 are shown and described herein, it should be understood that other types of lever position measurement sensors could be used without departing from the present invention. For example, angular sensors, such as potentiometers or resolvers, or linear position sensors (LVDTs) could be used, among other possibilities.

As in the prior art example, the channels 82, 84 are referred to as "Channel A" 82 and "Channel B" 84. The RVDT sensor modules 88, 90 connect to two Throttle Quadrant Assembly modules 92, 94 that are connected, in turn, to two aircraft wiring blocks 96, 98. The wiring blocks 96, 98 connect to two EECs 100, 102.

In the electronic throttle system 80 of the present invention, as should be immediately apparent, the number of wires passing through the wiring blocks 96, 98 has been reduced. In the non-limiting example shown, the wires passing through the wiring blocks 96, 98 have been reduced by ⅗ as compared to the electronic throttle system 28 of the prior art. Not only does this reduce the weight of the aircraft 10, but it may also make the electronic throttle system 80 easier to install and maintain than the prior art electronic throttle system 28.

Figure 5:
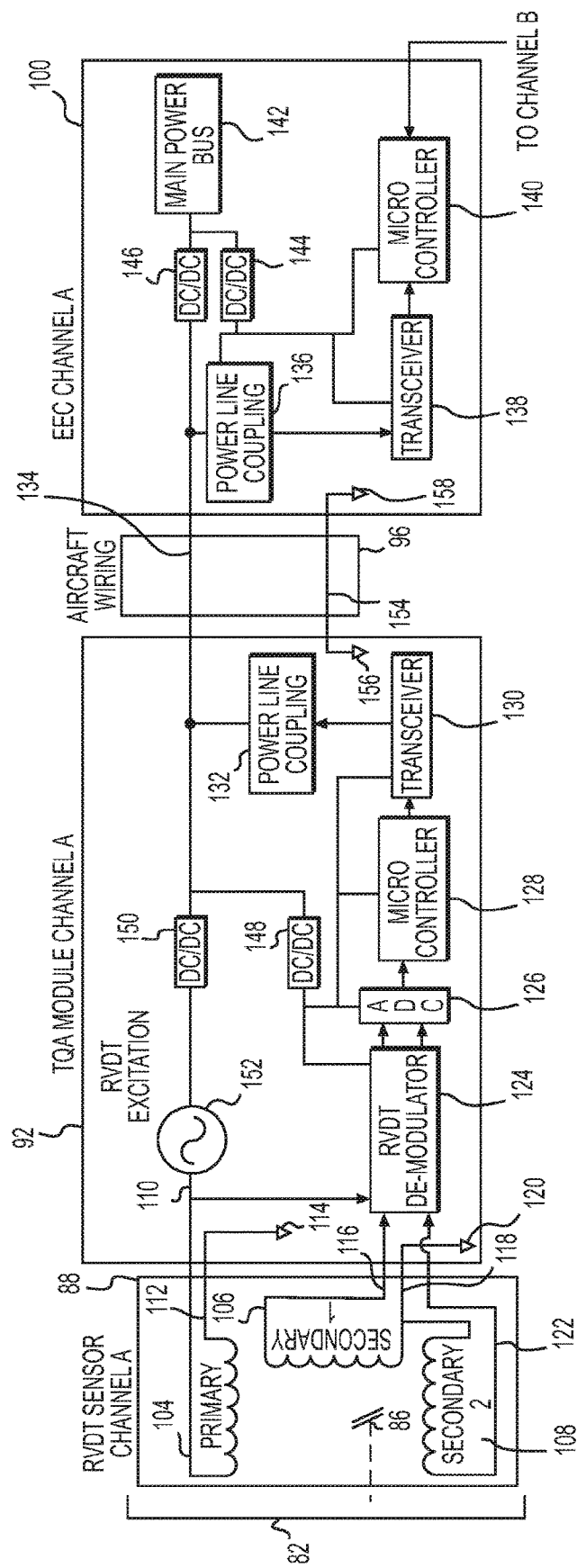
FIG. 5 is a circuit diagram of one of the two channels for the electronic throttle system that is illustrated in FIG. 4.

To facilitate discussion of the electronic throttle system 80 of the present invention, FIG. 5 illustrates the first channel 82 or Channel A. The components of the first channel 82 are generally the same as the components for the second channel 84 or Channel B. As a result, the discussion of the first channel 82 is considered to be sufficient also to describe the construction of the second channel 84.

With reference to FIG. 5, the RVDT sensor module 88 receives signals from the flight crew via the throttle 86. The RVDT sensor module 88 includes a primary coil 104, a first secondary coil 106 and a second secondary coil 108. As in the prior art system 28, the three coils 104, 106, 108 generate throttle signals that may be utilized by the micro-controller for the engines 24, 26.

As shown in FIG. 5, the primary coil 104 supplies the throttle signals to a TQA module 92 via a signal wire 110. The primary coil 104 also is connected via a ground wire 112 to a ground 114. Similarly, the first secondary coil 106 is connected to a TQA module 92 via a signal wire 116 and is connected, via a ground wire 118, to a ground 120. The second secondary coil 108 is connected to a TQA module 92 via a signal wire 122. The second secondary coil 108 is connected to the same ground 120 via the ground wire 118 as the first secondary coil 106.

Since the electronic throttle system 80 of the present invention has, as one of its aspects, a reduction in the number of wires making up the wiring block 96, the electronic throttle system 80 of the present invention includes the TQA module 92, unlike the system 28 in the prior art. In addition, to accommodate fewer wires, the EEC 100 has been reconfigured.

The TQA module 92 is contemplated to be positioned near to the throttle 86 on or near the flight deck of the aircraft 10. The EEC 100 is contemplated to be positioned proximate (or near) to the engines 24, 26. So that the throttle signals may be provided from the throttle lever 86 to the engines 24, 26, the throttle signals are first processed by the TQA module 92 before being sent to the EEC 100. It has been found that use of electronic modules at the TQA module 92 and at the EEC 100 may improve isolation of faults between the EEC 100, TQA module 92, and wiring.

The TQA module 92 includes a RVDT demodulator 124 (or other position sensor demodulator) that receives the throttle signals from the coils 104, 106, 108. The signals proceed from the RVDT demodulator 124, through the AC/DC converter 126, to the TQA micro-controller 128 (also referred to more broadly herein as the TQA controller 128). From the TQA micro-controller 128, the throttle signals are sent to a TQA transceiver 130, which provides the throttle signals to a TQA power line coupling 132. The throttle signals are then sent, via a signal/power line 134 to the EEC 100. As used herein, the term "signal/power line" refers to a communication line that is able to carry both power and data signals.

At the EEC 100, the throttle signals pass through an EEC power line coupling 136 where the throttle signals are passed to an EEC transceiver 138. From the EEC transceiver 138, the throttle signals are provided to the EEC micro-controller 140 (also referred to more broadly herein as the EEC controller 140). At the EEC micro-controller 140, the throttle signals are translated (or converted) into a signal that may be received by the engine 24, 26 for throttle control thereover.

As also illustrated in FIG. 5, the EEC 100 includes a main power bus 142, which provides DC power to the various components of the electronic throttle control system 80 of the present invention. It should, however, be understood that the power from the main power bus 142 could also be AC power without departing from the present invention.

From the main power bus 142, power is provided through two DC/DC converters 144, 146. Power from the main power bus 142 of the EEC 100 is also provided to the TQA module 92 via the signal/power line 134. As such, the EEC 100 electrical power is used to power at least some of the circuitry within the TQA module 92, such as the sensor acquisition circuitry (the demodulator 124). The EEC 100 power supply is independent of aircraft power when the aircraft engine is running, such that the TQA module 92 has a level of independence from the aircraft power.

When power reaches the TQA module 92, the power is provided to two DC/DC converters 148, 150 and the RVDT exciter 152.

FIG. 5 also illustrates a ground wire 154 that extends between a TQA ground 156 and an EEC ground 158. The ground wire 154 is part of the aircraft wiring block 96.

As should be apparent from FIG. 5, the provision of a signal/power line 134 greatly simplifies the construction of the electronic throttle system 80 of the present invention, as the five wires required in the prior art system described with respect to FIGS. 2 and 3 are replaced by two wires 134, 154 that pass through the wiring block 96.

In an embodiment of the present invention, the signal/power line 134 relies on Power Line Communication ("PLC") for its operation. PLC refers to a technique whereby a high frequency signal is superimposed on a DC voltage. As such, the same electrical wire can be used for both carrying power (over low frequency) and data (over high frequency). Data can be encoded through voltage or frequency modulation depending on the standard used. The PLC should also support a typical refresh rate of the throttle lever position. Not only does PLC allow for a simpler construction for the throttle system 80, but the PLC also helps to immunize the signals from external interference and to avoid (or at least minimize) detrimental effects of interference with other signals. Moreover, PLC may be employed so that the signals remain below the Electromagnetic Interference ("EMI") cutoff for signals in an aircraft 10.

While there is some additional weight and complexity in the electronic throttle system 80 of the present invention due to the addition of the TQA module 92 and the reconfiguration of the EEC module 100, it is contemplated that the system 80 is far simpler, less complex, lighter in weight, and less costly than the electronic throttle system 28 described in connection with FIGS. 2 and 3.

With continued reference to FIG. 5, a brief discussion of the operation of the electronic throttle control system 80 is now provided.

When the throttle lever 86 is manipulated by a member of the flight crew, the RVDT sensor module 88 (or other position measurement sensor) detects the position of the throttle lever 86 and generates a position signal indicative of the position of the throttle lever 86 using excitation signals provided by the RVDT excitation 152. The position signal is sent to an RVDT demodulator 124, which is connected to the RVDT sensor module 88. The RVDT demodulator 124 generates a demodulated position signal.

The demodulated position signal then passes through the AC/DC converter 126 on its way to the TQA micro-controller 128. The TQA micro-controller 128 receives the demodulated position signal from the AC/DC converter 126 and produces a micro-controller throttle signal (also referred more broadly to herein as a controller throttle signal). The micro-controller throttle signal is then passed to a transceiver 130 and a power line coupling 132 where the micro-controller throttle signal is introduced into the signal/power line 134 for transmission to the EEC module 100. As should be apparent, in accordance with the present embodiment, the transceiver 130 and power line coupling 132 prepare the micro-controller throttle signal for transmission via PLC methodologies. In other words, the transceiver 130 and power line coupling 132 create a PLC throttle signal that is transmitted via the signal/power line 134 to the EEC module 100.

At the EEC module 100, the PLC throttle signal is "decoded." As a result, the PLC throttle signal passes through the power line coupling 136 and transceiver 138, thereby transforming the PLC throttle signal back to the micro-controller throttle signal. More specifically, the power line coupling 136 may use a band-pass filter to isolate the signal from the DC power. The throttle signal may then be amplified by the transceiver 138 before decoding. Once returned to the form of the micro-controller throttle signal, the EEC micro-controller 140 may process the micro-controller throttle signal to generate the throttle control signal for the engine 24, 26.

Although not shown in the Figures, the TQA module 148 may include built-in test circuitry that allows the TQA module 148 to determine the health of the throttle lever position and transmit this information to the EEC 100 using the signal/power line 134. Likewise the EEC 100 may include built-in test circuitry to allow the EEC 100 to determine the health of the transceiver 138 data reception.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A throttle system for providing throttle control for an engine on an aircraft, comprising:
    a throttle quadrant assembly (TQA) module in electrical communication with a throttle lever for receiving a position signal indicative of a magnitude for a throttle of the engine, the TQA module being operative to convert the position signal into a throttle signal;
    an engine electronic control (EEC) module connected to the TQA module to translate the throttle signal into a throttle control signal for the engine; and
    a power line connecting the TQA module to the EEC module and carrying power from the EEC module to the TQA module,
    wherein the power line carries the throttle signal from the TQA module to the EEC module and wherein the power supplied by the EEC module to the TQA module is independent of aircraft power when the engine is running.

2. The throttle system of claim 1, wherein the power line carries both the throttle signal and the power by relying on power line communication (PLC).

3. The throttle system of claim 1, further comprising:
a rotary variable differential transformer (RVDT) connected to the throttle lever,
wherein the RVDT comprises at least three coils adapted to detect the position of the throttle lever and generate the position signal commensurate therewith.

4. The throttle system of claim 1, further comprising a wiring block comprising:
the power line; and
a ground line extending between the TQA module to the EEC module.

5. The throttle system of claim 3, wherein the TQA module comprises an RVDT demodulator connected to the RVDT that receives the position signal and generates a demodulated position signal.

6. The throttle system of claim 5, wherein the TQA module further comprises a TQA controller connected to the RVDT demodulator that receives the demodulated position signal and generates a controller throttle signal.

7. The throttle system of claim 6, wherein the TQA module further comprises a TQA transceiver connected to the TQA controller to translate the controller throttle signal into the throttle signal before introducing the throttle signal to the power line.

8. The throttle system of claim 7, wherein the EEC module comprises an EEC transceiver connected to the power line to receive the throttle signal and decode the throttle signal to recreate the controller throttle signal.

9. The throttle system of claim 8, wherein the EEC module further comprises an EEC controller that receives the controller throttle signal from the EEC transceiver and generates a throttle control signal to be sent to the engine.

10. The throttle system of claim 1, wherein the EEC module comprises an EEC transceiver connected to the power line to receive the throttle signal and decode the throttle signal to create a controller throttle signal.

11. The throttle system of claim 10, wherein the EEC module further comprises an EEC controller that receives the controller throttle signal from the EEC transceiver and generates a throttle control signal to be sent to the engine.

12. The throttle system of claim 1, wherein the EEC module comprises a main power bus that provides power to the EEC module and the TQA module.

13. The throttle system of claim 1, wherein the main power bus provides power to the TQA module via the power line.

14. A throttle quadrant assembly (TQA) module in communication with an engine electronic control (EEC) module, a power line connecting the TQA module to the EEC module and carrying power from the EEC module to the TQA module, the TQA module comprising:
a demodulator in electrical communication with at least one position measurement sensor that is connected to a throttle lever, the demodulator receiving from the at least one position measurement sensor a throttle lever position signal and generating from the throttle lever position signal a demodulated position signal;
a TQA controller in electrical communication with the demodulator for receiving the demodulated position signal and generating a controller throttle signal; and
a TQA transceiver connected to the TQA controller to translate the controller throttle signal into a throttle signal before introducing the throttle signal into the power line for transmission towards the EEC module over the power line, wherein the power supplied by the EEC module to the TQA module is independent of aircraft power when an engine is running.

15. A method of operation for a throttle quadrant assembly (TQA) module in electrical communication with a throttle lever of an aircraft, the method comprising:
receiving a position signal indicative of a position of the throttle lever from a position measurement sensor, the position signal being indicative of a magnitude for a throttle of an engine;
processing the position signal in order to generate a throttle signal suitable for transmission to an engine electronic control (EEC) module; and
introducing the throttle signal to a power line connecting the TQA module to the EEC module for carrying power from the EEC module to the TQA module, the throttle signal being introduced into the power line in order to transmit the throttle signal from the TQA module to the engine electronic control (EEC) module, wherein the power supplied by the EEC to the TQA module is independent of aircraft power when the engine is running.

16. The throttle system of claim 9, wherein the EEC module comprises a main power bus that provides power to the EEC module and the TQA module.

17. The throttle system of claim 11, wherein the EEC module comprises a main power bus that provides power to the EEC module and the TQA module.

* * * * *